(12) United States Patent
Nathans

(10) Patent No.: US 6,581,712 B1
(45) Date of Patent: Jun. 24, 2003

(54) RADIO-LESS SELF CONTAINED APPARATUS FOR RAPIDLY THWARTING THEFT OF LARGE TRUCKS BY TERRORISTS OR HIJACKERS

(76) Inventor: Robert L. Nathans, 36 Stag Dr., Billerica, MA (US) 01821

( * ) Notice: Subject to any disclaimer, the term of this patent is extended or adjusted under 35 U.S.C. 154(b) by 0 days.

(21) Appl. No.: 10/243,485

(22) Filed: Sep. 14, 2002

(51) Int. Cl.⁷ .............................................. B62H 5/00
(52) U.S. Cl. .................. 180/287; 340/426; 180/273; 180/279
(58) Field of Search ................ 180/272, 279, 180/273, 287; 307/10.2, 10.3, 10.4, 10.5; 340/426

(56) References Cited

U.S. PATENT DOCUMENTS

| | | | | |
|---|---|---|---|---|
| 4,625,329 A | * | 11/1986 | Ishikawa et al. | 382/104 |
| 5,307,048 A | * | 4/1994 | Sonders | 340/426 |
| 5,335,748 A | * | 8/1994 | Wilson | 180/270 |
| 5,382,948 A | * | 1/1995 | Richmond | 340/825.36 |
| 5,408,536 A | * | 4/1995 | Lemelson | 382/115 |
| 5,424,712 A | * | 6/1995 | Rosenberger | 340/426 |
| 5,438,311 A | * | 8/1995 | Lane, Sr. | 340/426 |
| 5,440,177 A | * | 8/1995 | Bellin et al. | 307/10.5 |
| 5,453,730 A | * | 9/1995 | De-Grinis et al. | 340/426 |
| 5,745,030 A | * | 4/1998 | Aaron | 340/426 |
| 6,252,978 B1 | * | 6/2001 | Grantz | 382/118 |

* cited by examiner

Primary Examiner—Paul N. Dickson
Assistant Examiner—Toan To
(74) Attorney, Agent, or Firm—Robert Nathans

(57) ABSTRACT

A driver briefly places his hand upon a biometric hand reader once during each successive four minute recurrent time interval established by a microprocessor that continuous to produce a maintain-truck-operative signal to prevent truck disablement that would otherwise occur while driving. Should a hijacker drive the truck away and use the hand reader, the reader senses a mismatch, will cease to produce the maintain-truck-operative signal, and the truck will stop. The hijacker is prevented from occupying the cab and forcing the driver to drive and use the sensor by a switch-mat within the passenger area that senses the hijacker's presence and disables the truck. A facial recognition reader will stop the truck if the driver is absent in an even faster manner, which is very important when a gasoline truck that is a bomb-on-wheels is stolen. More affordable data input sensors comprising a steering wheel pushbutton encoder are also disclosed.

20 Claims, 2 Drawing Sheets

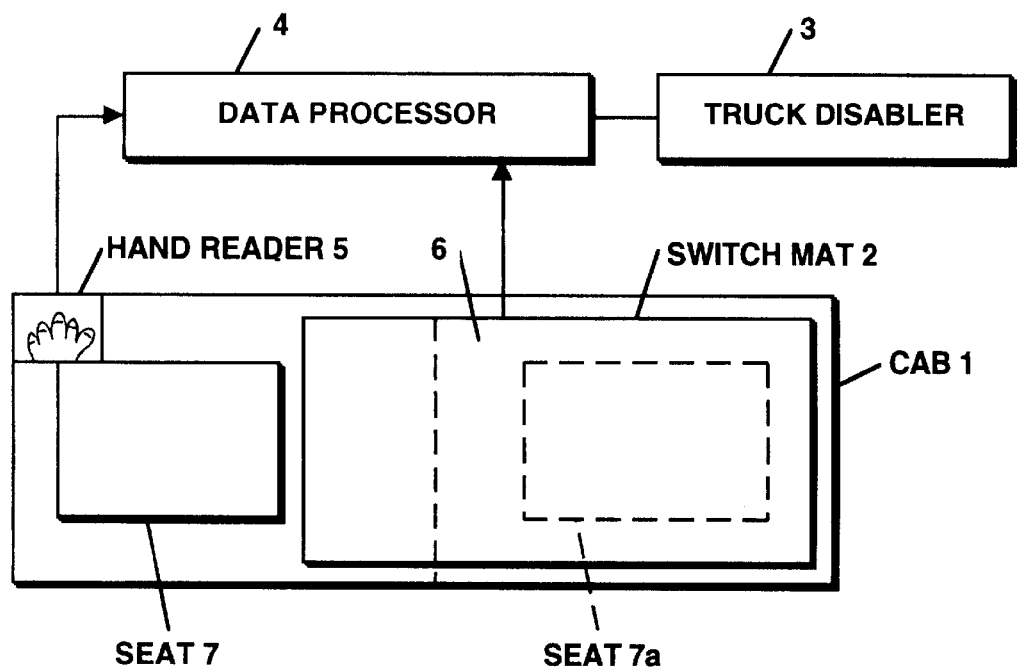
FIG. 1
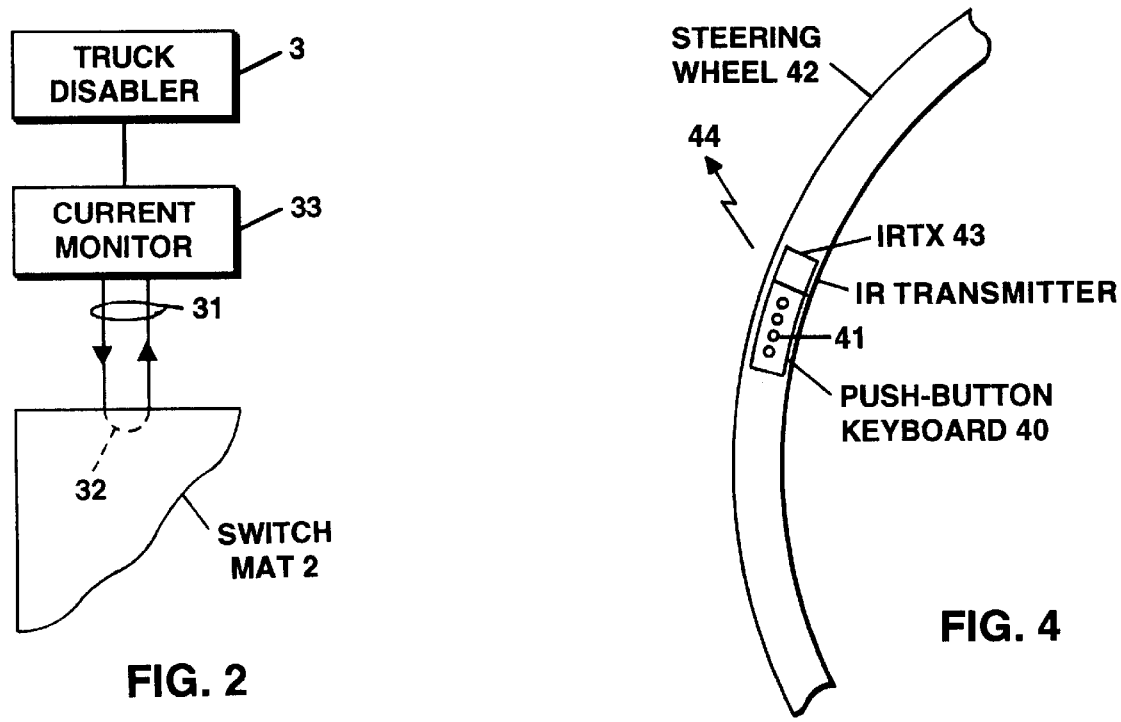
FIG. 2
FIG. 4

RADIO-LESS SELF CONTAINED APPARATUS FOR RAPIDLY THWARTING THEFT OF LARGE TRUCKS BY TERRORISTS OR HIJACKERS

BACKGROUND OF THE INVENTION

Hijacking of large tractor-trailer trucks and tanker trucks by terrorists can have devastating consequences. Trucks carrying valuable commercial cargo or even hazardous material are increasingly vulnerable to hijacking. Over twenty-thousand truck hijackings in 2001 worldwide have been reported and billions of dollars of cargo have been lost, in addition to the loss of human life caused by terrorists and the resulting disruptive fear and economic loss. Also, large trucks themselves can cost up to $150,000.

In a recent speech, California Gov. Gray Davis has been concerned that a hijacker can turn a big rig into a motorized missile. Attorney General Ashcroft warned Congress of potential terrorist attacks using trucks laden with hazardous materials or explosives. Large cities are particularly vulnerable to trucks used as motorized missiles. Numerous gasoline tanker trucks supplying gas stations, can be stolen at gunpoint, driven into cities, and exploded within tunnels, upon bridges or at the foot of tall buildings or shopping malls occupied by many persons. Substantial portions of cities could be shut down as a result of even one such theft and truck misuse. Trucks abroad carrying propane have recently pulled up in front of houses of worship killing many people. Also, inspections of tanker trucks at key locations, transporting gasoline, can reveal little because the gasoline itself constitutes the bomb itself. Recently, interstate highways have been shut down for substantial time periods due to tanker trucks accidentally crashing into bridges, even in the absence of a terrorist attack on them; the impact of the crash itself produces the bomb.

Various approaches have been proposed to meet these threats. One approach is to have the driver send a radio signal to the police or central trucking dispatcher in order to summon law enforcement personnel if the driver is in trouble. Using another approach, a driver can cause lights and sirens on the roofs of tractor-trailer trucks to summon law enforcement and yet another approach employs the Global Positioning System (GPS) to alert a central dispatcher by radio that the truck has improperly deviated from its intended trip itinerary. However, the use of radio links to alert truck dispatchers at remote stations that alert other persons like the police at other stations, wastes valuable time. Dispatchers being so notified by radio may have briefly left their stations when the emergency call arrives. Also, such radio links can be unreliable at times which is particularly detrimental during crises. Radio transmissions can be interfered with by RF generating sources and large obstacles such as tall buildings, creating canyons in cities. Another problem with these approaches is that the resulting use of law enforcement to counter the terrorist or cargo thief, can involve car chases and gun battles that can result in loss of the lives of law enforcement officers, the truck driver, or drivers of passenger cars in the vicinity of a truck being recaptured. If the truck is disabled and parked by the side of the road in response to a hijacking, the intruder is likely to flee the scene rather than stand and fight. Less importantly, traffic flow will not be stopped for extended periods.

Accordingly, it is submitted that large truck security is better served by avoiding such highly destructive confrontations between law enforcement and hijackers by discouraging hijacking attempts in the first place. One such approach is to disable the truck by for example, grounding the ignition if a proper all-is-well code is not inserted into a truck disablement apparatus by the driver; see U.S. Pat. No. 3,790,933 to Cort, that involves having a central dispatcher send a secret digital code to the driver in response to a request sent by the driver to the dispatcher, and upon receipt of the digital code from the dispatcher, the driver inserts the code into the device to prevent the ignition from being disabled. At a later time this process is repeated when the driver again contacts the central dispatcher. This process relies on the aforesaid somewhat unreliable radio link approach. Another problem with this approach is that it is cumbersome and too slow to obtain prompt truck stoppage, and having the driver input the code as described distracts the driver from keeping his eyes on the road in the interest of safe driving. This is particularly important for a gasoline truck that often explodes in crashes on impact, and thus can be used to bomb a nearby target, as mentioned above. Likewise with respect to a tanker truck that can spread poisonous gas e.g. chlorine gas over a wide area upon impact. U.S. Pat. No. 5,686,765 to Washington discloses the use of a physiological device that can disable an ignition system of a passenger car upon operation by an improper driver, but the patent does not suggest its use in connection with hijacking or apparatus to provide the desired rapid action to rapidly stop a truck in the process of being hijacked.

SUMMARY OF PREFERRED EMBODIMENTS OF THE INVENTION

The present invention is believed to provide apparatus for overcoming the above stated disadvantages of prior anti-hijacking proposals in a safe, reliable and fast acting manner.

In order to prevent a hijacker from stealing a large tanker truck or tractor-trailer from a driver while it is idling just before leaving a truck stop, or while waiting for a green light, and driving it away, a truck disabling device such as an ignition interrupt circuit is made to disable the truck, while being driven, in the absence of an "maintain-truck-operative" OK input code, that is periodically fed into a microprocessor by an authorized driver during each time interval of a succession of intervals lasting about four minutes, to keep the truck going without being disabled. The OK input code is preferably produced by the authorized driver inserting his hand once during each successive interval into the commercially available hand shape reader, provided that the driver's hand profile matches a stored hand data template of one or more authorized drivers in the hand reader. If a hijacker drives the truck away, his hand will not produce the OK signal required after several minutes and the truck will become later disabled.

If the biometric recognition device is a preferred facial feature reader, the truck can be much more rapidly disabled upon being driven by a hijacker, since the facial feature reader would almost immediately stop producing OK data input signals upon the authorized driver's absence, to enable stoppage of the truck.

However, the hijacker could defeat these systems by occupying the second passenger side area, while forcing the driver to proceed, by threatening the driver with a weapon. The driver would be told to do whatever it takes to proceed, and the driver would normally keep inputting the OK input code to keep the truck going.

This action by the hijacker is thwarted by quickly disabling the truck in response to an attempt by the hijacker to sit on the passenger seat, or stand or crouch on the floor in the neighborhood normally occupied by the second passenger side seat. Mats containing pressure actuated switches are affixed to the passenger side seat, if present, and over floor areas or article storage bins in the neighborhood of the seat. Such switch mats are commercially available and some are called "Press-At-Any-Point" sensing switches and are electrically coupled to the aforesaid control micro-processor that disables the truck when the weight of a hijacker, upon occupying the truck cab, actuates the pressure sensitive mat by closing switches embedded in the mat. Other unauthorized persons such as hitch-hikers would also disable the truck. Should the driver accidentally step on the mat, he merely resets the system by restarting the ignition. A sign could be posted near the truck doors: "TRUCK WILL NOT OPERATE IF A SECOND PERSON OCCUPIES THE CAB." This helps stopping a hijacker from an attempt to hijack in the first place, which normally provides the best security. Another approach is to block an intruder from entering the passenger side area altogether by means of physical barriers such as removable fences having thin steel barrier elements, or transparent partitioning, that could be locked to the truck floor with a key or bolted down. Time locks could also be used for this purpose.

Apparatus is also provided for even more rapidly thwarting theft of a tanker truck carrying explosive, flammable or dangerous cargoes thus turning the truck into a weapon by a terrorist in a very short time period. In contrast with the hand biometric sensing device, with its delays due to its "every four minute" periodic driver hand authenticity test, facial feature sensor means are provided that require no action by a truck driver, and which produce an almost immediate OK input signal in response to continuous, rather than intermittent, scanning examination by the facial feature reader of the face of an authorized truck driver. Should a hijacker replace the driver in an attempt to drive the truck, the truck disabling device can stop the truck in a very short time because use of the facial feature sensor does not employ the aforesaid successive test intervals calling for driver hand insertions every four minutes or so. This is of extreme importance in connection with a tanker truck carrying an explosive cargo that can be used as a bomb on wheels in a few minutes. The body sensor in this embodiment of the invention, requiring no driver action, is preferably a facial feature sensor, although a sophisticated biometric eyeball reading device using a dual image field beam splitter, that does not interfere with the driver's vision of the road could be used. Also, the absence of manual hand insertion into the reader to periodically input the OK signal, enhances safe driving even more, which is even more important in connection with the transportation of explosive cargoes.

Regarding other features, a code known only to the dispatcher, could be employed with a conventional electronic lock to disable the entire system for a period where it is desired to permit a second person to occupy the passenger seat area in the usual way. Also, should a person tamper with the intruder sensing switch mat, by cutting the electrical coupling between the mat and the data processor, the resulting interruption of current flow through the cable can be sensed to actuate the truck disable device. A more affordable maintain-truck-operative input sensor includes a slender push button keyboard remote sensor having four-in-line pushbuttons to be contacted by four fingers of the driver, and clamped upon and under the steering wheel for hand wrap-around actuation. A TV type infra-red link could link the keyboard remote sensor to the data processor.

BRIEF DESCRIPTION OF THE DRAWINGS

The various features and advantages of the invention will become more apparent upon study of the following detailed description, taken in conjunction with the drawings in which:

FIG. 1 discloses the overall arrangement of the key components of a preferred embodiment of the invention;

FIG. 2 illustrates a device for detecting tampering with the protective hijacker sensing mat;

FIG. 4 shows an economical pushbutton data input device that can be used in place of the biometric data input devices.

DETAILED DESCRIPTION OF PREFERRED EMBODIMENTS OF THE INVENTION

Figure 3:
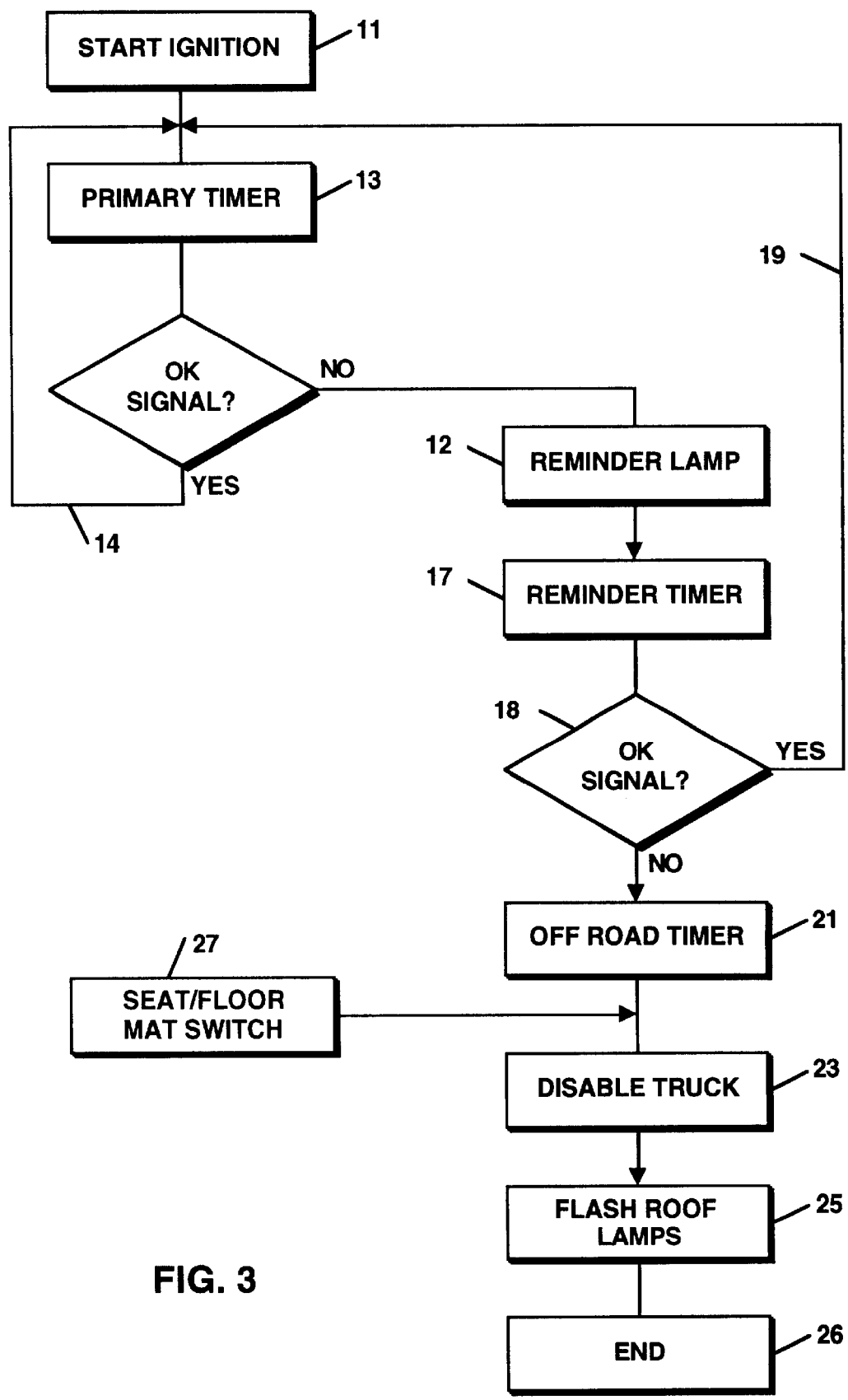
FIG. 3 shows a flow chart of the steps employed by the perferred embodiment.

As schematically indicated in FIG. 1, a cab 1 of a large truck contains a driver's seat 7 in the driver side of the cab 1, pressure sensitive switch mat 2 that can be adhered over the passenger seat 7a by a super-strong dry adhesive or other attaching device. The pressure sensitive switch mat 2 can additionally cover floor areas 6 adjacent the passenger seat, or the entire passenger side floor area, in the absence of a passenger seat. Optionally, mat sections can also cover article storage bins in the passenger area. A data processor 4, typically a conventional microprocessor chip, is electrically coupled between a truck disable device 3 and the pressure sensitive switch mat 2. A biometric sensor 5, preferably a palm or hand reader, is positioned upon the dashboard within easy reach of the driver on the driver's side of cab 1.

The aforesaid maintain-truck-operative input code is normally received by the data processor 4 about every three-four minutes, to prevent the truck disable device 3 from stopping the truck. An input code which corresponds to the shape of the driver's hand is produced by the biometric sensor hand reader 5. Every three-four minutes or so the driver merely places his hand upon the hand reader to continue truck operation and prevent actuation of the prior art truck disable device 3, which could disable the ignition or cut off fuel flow. Should a hijacker attempt to put his hand into the hand reader, the reader will not produce an authorized OK output signal because the code produced by the hand of the hijacker will not match the stored code template of an authorized driver. This action is sensed by the data processor and the truck shutdown process commences. Template codes of a number of authorized drivers are stored in the hand reader in the conventional manner.

The first sensor is preferably a commercially available hand or palm reader 5 since it is important that the driver not be distracted from his concentration on the road. The placing of the hand on the hand reader is quick and easy and not distracting and is believed to be a good reader to use, although a fingerprint reader is also acceptable, provided the driver keeps his thumb clean. If the body feature or biometric recognition device is a facial feature reader, the truck can be much more rapidly disabled upon operation by a hijacker, since the authorized driver need not periodically actuate the hand reader, and the facial feature reader would almost instantaneously produce an OK match signal or a disable mismatch signal. Since the head of the driver is usually in one place, facial recognition is believed to be very fast and reliable because a number of head on facial snapshots of the driver seated in one position may be rapidly made for comparison with the stored driver's templates. This is in contrast with the less reliable taking of one or two snap shots of a particular face in a crowd that may not be facing the camera at all.

Thus, should a hijacker replace the driver in the driver seat, the truck disabling device can stop the truck in an extremely short time period because use of the facial feature reader does not employ the aforesaid successive test intervals with driver hand insertions, and almost immediately produces a truck disable condition which is of extreme importance in connection with a tanker truck carrying an explosive cargo used as a bomb on wheels, where time is of the essence. Also, the absence of calling for driver manual action to input data from time to time further enhances safe driving, where safety is even more important in connection with the transportation of explosive cargoes such as gasoline and propane.

In spite of the aforesaid sign on the outside of the cab, informing a hijacker that occupancy of the passenger side will shut down operation of the truck, assume a terrorist or hijacker occupies the passenger side of the cab, pulls a gun on the driver, and tells him to follow directions to the target of the terrorist, or warehouse used to fence the cargo of the truck. The second sensor switch mat senses the weight of the intruder because one or more switches embedded in the mat are closed to signal the microprocessor to initiate the shut down process to stop the truck. Suitable "Press-at-any-point" mats for use in the apparatus disclosed above are commercially available.

Optionally, should the hijacker attempt to disable the switch mat 2 by cutting braided cable 31 of FIG. 2, a current monitor 33, which can be part of the microprocessor, detects a loss of current that is usually passed through the cable and a "mat presence test" portion 32 of the mat, which can merely be a conductor that bridges the cable. This action in turn produces actuation of the truck disable device 3.

Optionally, it may also be desirable to produce a truck disable signal only if the weight sensed by the intruder second sensor exceeds a predetermined level, indicating the presence of a person, in contrast with lighter objects. In this case, various objects could conveniently be transported upon passenger seat or over floor areas covered by the switch mats, without causing the truck disable device to be actuated. However, this feature need not be considered for many objects transported in the passenger side because these articles can be conveniently stored in bins in the cab or even a foot locker on the floor containing the trucker's traveling apparel and could, if desired, even be covered by a switch-mat section to further block the presence of a hijacker. Pressure sensitive analog signal producing mats can be combined with go-no-go switch-mats, and are available for producing an analog current that has a value proportional to the pressure exerted upon the mat. The worker in the art can easily program the microprocessor to produce a truck disable signal should the sensed weight of the mat exceed a predetermined level, to distinguish the weight of an intruder from everyday packages. A predetermined level in the neighborhood of say 100 pounds would be appropriate.

Suitable mats for use in the apparatus disclosed above have been commercially available. For example, "Press-At-Any-Point" switch mats have been made available by "Tapeswitch International Inc." of Farmingdale, N.Y. Some of these mats can be tough, puncture-proof and waterproof The mats can be cut in sections that cover the passenger seat and any other appropriate person monitoring area in the cab including covering article storage containers and a driver article container to sense the presence of a hijacker.

FIG. 3 shows a flow chart which indicates the functioning of the aforesaid components. Upon startup involving actuation of the ignition (step 11), and after a short engine warm-up period, primary three minute timer is tripped, step 13. Should an OK signal be received from the hand reader within the three minute period, the timer is reset via 14 to establish the succeeding three minute period. If all goes well the driver keeps placing his hand upon hand palm reader during each successive three minute interval until he reaches his destination. Should the hijacker force the driver out of the truck and drive away, the truck will become disabled since his hand will not produce the OK signal as the hijacker's hand template is not stored in the reader.

Should the driver forget to place his or her hand upon the reader during any three-four minute interval, reminder lamp will become lit (step 12), along with a beep, and a reminder interval will commence, step 17. When the driver places his hand upon the reader, during the one minute reminder timer interval, step 17, the primary timer is tripped (step 18) to establish the next three minute primary interval via 19. If he fails to do this, the truck will be disabled after operation of the now tripped off road timer. Should a hijacker enter the passenger area when the truck is stopped, to force the driver to drive, a mat output signal 27 is produced. In response, the truck disabled device is immediately actuated to prevent the truck from being driven and the truck mounted roof lamps flash to alert law enforcement officers. Should the hijacker occupy the driver's seat initially, he can drive the truck for a short time, but the absence of the OK signal actuates the off road timer and warning lamp, step 21, and the truck is disabled, probably by the side of the road. Optionally, ceiling mounted lamps or the like, widely separated, and mounted upon the roof of the truck will flash, step 25 and 26, to signal a police helicopter or car.

Another more economical embodiment, shown in FIG. 4, can employ a non-biometric OK input signal sensor which could employ a slender push button keyboard 40 having four in line pushbuttons 41 to be contacted by four fingers of the driver, and clamped upon and under the steering wheel 42. The keyboard could be coupled via IR transmitter 43 to the microprocessor via a radio-less magnetic field link or an infra-red link 44 similar to links used in TV remotes. The OK input code is known to the driver and unknown to the hijacker, and his four fingers could input a known digital code. Any particular button or buttons could be pressed one or two times, to easily enter a code. This approach is however less desirable because the code could be transferred to the intruder.

Since variations of the foregoing steps and apparatus will occur to workers in the art, the scope of the invention is to be restricted solely by the language of the following claims and art recognized equivalents. For example, the aforesaid switch mat having a matrix of pressure sensitive switches throughout could employ a radiant energy transmitter for actuating a receiver coupled to the data processor in place of the cable 31 in FIG. 2. The truck disable device could comprise a device for disabling the ignition system or interrupting the fuel flow from the fuel pump, or even a braking device. While sonic, infra-red beam or radio frequency object detectors for detecting a hijacker in the passenger area could be employed rather than the described switch mat sensors, they are less preferred as they could be subject to malfunctioning caused by interference from sonic engine noise and other RF radiation in the vicinity. In contrast, the direct current switch mats are highly reliable. Also, the data processor could comprise electromechanical components rather than a solid state microprocessor. The term "data inputted" into the first sensor by the driver, includes data such as facial reader data automatically read although no driver manual actuation is performed to input such data. Also, the successive test interval lengths need not be predetermined, and can be varied randomly if desired.

What is claimed is:

1. Apparatus for thwarting theft of a truck having a cab with a first area within which an authorized truck driver is present and a second area which may be occupied by a passenger comprising:

(a) a truck disable device;

(b) first sensor means for producing maintain-truck-operative input signals in response to data inputted into said first sensor means by said authorized truck driver;

(c) data processor means coupled to said first sensor means for establishing a succession of test intervals and for enabling actuation of said truck disable device in the absence of receipt of said maintain-truck-operative input signals within a given test intervals; and (d) second sensor means for causing said truck disable device to stop said truck upon detection of a person within said second area.

2. The apparatus of claim 1 wherein said second sensor means comprises pressure actuated means, responsive to a person's weight.

3. The apparatus of claim 2 wherein said second sensor means comprises at least one pressure sensitive mat.

4. The apparatus of claim 3 wherein said pressure sensitive mat is positioned upon a passenger seat within said second area.

5. The apparatus of claim 3 wherein pressure sensitive mats are positioned over floor or article storage portions within said second area.

6. The apparatus of claim 3 wherein said first sensor means includes a biometric sensor selected from the group consisting of hand readers, fingerprint readers, and facial feature readers, thus enabling driver production of said maintain truck operative input signals easily and rapidly without the driver being distracted from viewing the road for the sake of safety.

7. The apparatus of claim 2 wherein said second sensor means includes means for producing a truck disable signal only if weight sensed by said pressure actuated means exceeds a predetermined level, indicating the presence of a person, in contrast with lighter objects that may be transported within said second area.

8. The apparatus of claim 2 wherein said first sensor means includes a biometric sensor selected from the group consisting of hand readers, fingerprint readers, and facial feature readers, thus enabling driver production of said maintain truck operative input signals easily and rapidly without the driver being distracted from viewing the road for the sake of safety.

9. The apparatus of claim 1 including a second sensor presence monitor means for causing operation of said truck disable device upon interruption of current flow through a portion of said second sensor means.

10. The apparatus of claim 1 wherein a sign is posted in the vicinity of said cab stating that the truck will not operate should a second person occupy the cab.

11. The apparatus of claim 1 wherein said first sensor means includes a biometric sensor selected from the group consisting of hand readers, fingerprint readers and facial feature readers, thus enabling driver production of said maintain truck operative input signals easily and rapidly without the driver being distracted from viewing the road for the sake of safety.

12. The apparatus of claim 1 wherein said first sensor is a biometric facial feature reader for continuously examining the face of said driver and enabling virtually continuous feeding of said maintain-truck-operation input signals into said microprocessor.

13. The apparatus of claim 1 wherein said first sensor means includes a keyboard mounted upon a steering wheel of said truck.

14. Apparatus for thwarting theft of a truck having a cab with a first area within which a truck driver is present and a second area which may be occupied by a passenger comprising:

(a) a truck disable device;

(b) sensor means for producing maintain-truck-operative input signals in response to data inputted into said sensor means by said truck driver during operation of said truck;

(c) data processor means coupled to said sensor means for establishing a succession of various test intervals during operation of said truck and for enabling actuation of said truck disable device in the absence of receipt of said maintain-truck-operative input signals within a given test intervals; and (d) occupant control means for preventing a second person from occupying said second area during ongoing operation of said truck.

15. The apparatus of claim 14 wherein said occupant control means comprises a physical barrier for blocking entry by an unauthorized person into said second area.

16. The apparatus of claim 14 wherein said sensor includes a keyboard mounted upon a steering wheel of said truck.

17. Apparatus for thwarting theft of a truck having a cab with a first area within which an authorized truck driver is present and a second area which may be occupied by a passenger comprising:

(a) a truck disable device;

(b) sensor means for producing maintain-truck-operative input signals in response to data inputted into said sensor means by said authorized truck driver during operation of said truck;

(c) data processor means coupled to said sensor means for establishing a succession of various test intervals, each being less than four minutes in duration, during operation of said truck and for actuating said truck disable device in the absence of receipt of said maintain-truck-operative input signals within a test intervals of less than four minutes in duration; and (d) wherein said sensor means includes a biometric sensor selected from the group consisting of hand readers, fingerprint readers, and facial feature readers, thus enabling driver generation of said input signals easily and rapidly without the driver being distracted from viewing the road for the sake of safety.

18. The apparatus of claim 17 wherein said sensor is a biometric facial feature reader for continuously examining the face of said authorized driver and enabling virtually continuous feeding of said input signals into said microprocessor without the authorized driver having to take any action to input data.

19. Apparatus for thwarting theft of a truck comprising:

(a) a truck disable device;

(b) sensor means for producing maintain-truck-operative input signals in response to data inputted into said first sensor means by said authorized truck driver;

(c) data processor means coupled to said first sensor means for establishing a succession of test intervals during operation of said truck and for enabling actuation of said truck disable device in the absence of receipt of said maintain-truck-operative input signals within one or more of said test intervals; and (d) wherein said sensor means includes a keyboard mounted upon a steering wheel of said truck for ease of entry of a code into said data processor means.

20. The apparatus of claim 19 wherein said keyboard has at least four pushbuttons aligned upon said keyboard for ease of data entry.

* * * * *